UNITED STATES PATENT OFFICE.

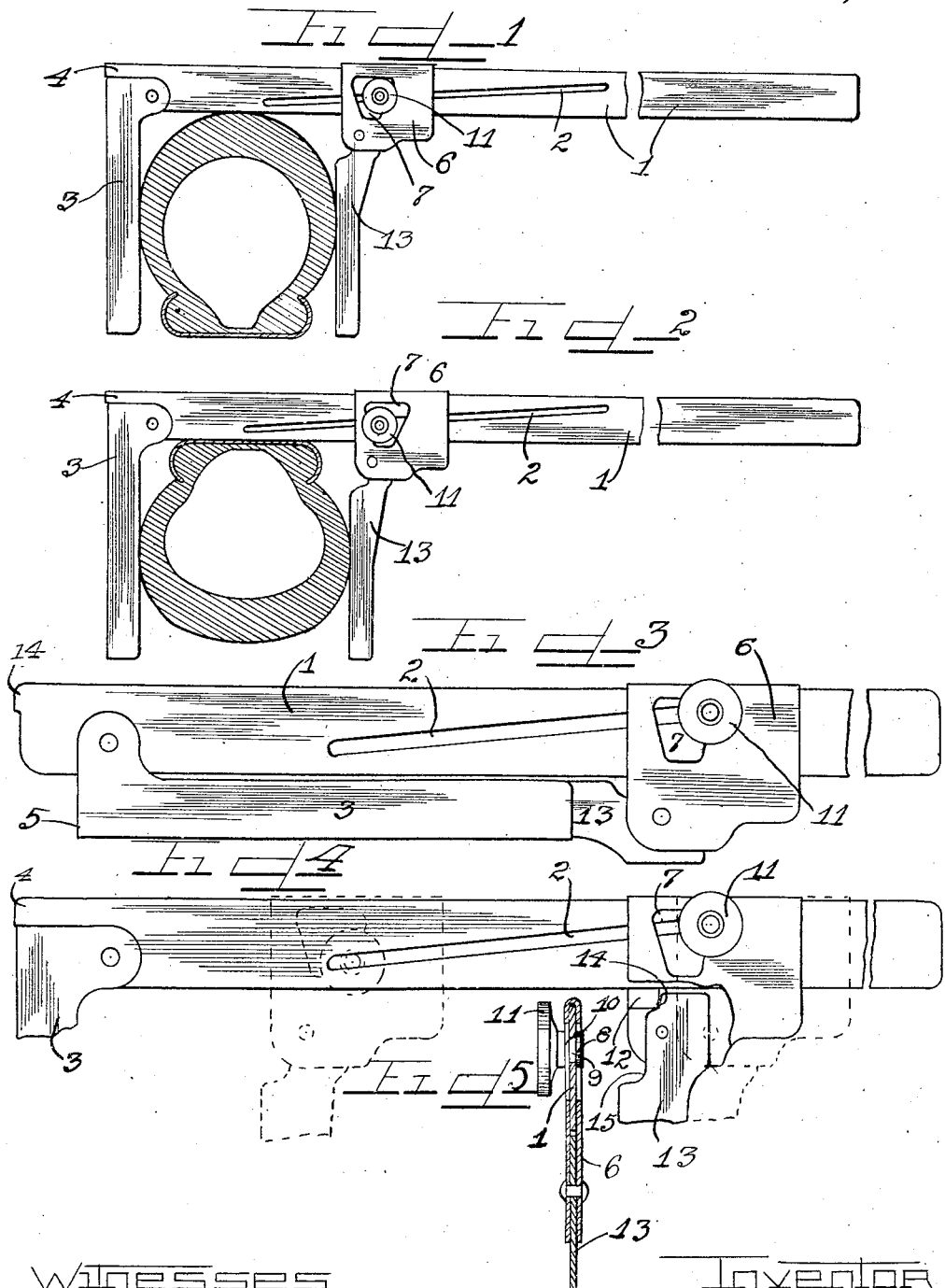

BAYARD E. TAYLOR, OF OAK PARK, ILLINOIS.

TIRE-CALIPER.

1,363,825.

Specification of Letters Patent.

Patented Dec. 28, 1920.

Application filed August 13, 1917. Serial No. 185,892.

*To all whom it may concern:*

Be it known that I, BAYARD E. TAYLOR, a citizen of the United States, and a resident of the village of Oak Park, in the county of Cook and State of Illinois, have invented certain new and useful Improvements in Tire-Calipers; and I do hereby declare that the following is a full, clear, and exact description of the same, reference being had to the accompanying drawings, and to the numerals of reference marked thereon, which form a part of this specification.

Tire calipers as heretofore constructed have proven objectionable for numerous reasons. In the first instance it is necessary to set the movable caliper arm to the diameter of the tire at a different point from the point of the load, then to adjust the caliper arm on the gage bar to the proper position on the load scale. This necessitates two distinct operations.

Further such calipers as heretofore constructed have had scales thereon which at night time necessitates the use of a lighting medium in order to read the same and this has caused much inconvenience. Again in such devices as heretofore constructed the slide head has been frictionally held on the scale bar by means of a spring. This has proven objectionable for if the friction between the slide head and scale is sufficient to prevent spreading of the adjustable caliper arm by inflation of the tire the same requires considerable effort in manual manipulation and if the friction is light enough to permit easy manipulation in setting the slide head on the scale bar then the slide head will not hold on inflating the tire and accuracy can not be attained.

A still further objection to the spring controlled slide heads is that yielding lateral movement of the caliper arm is permitted against the spring tension which prevents accurate and satisfactory use of the gage.

It is an object of this invention to provide a tire caliper in which the scale of the tire is manually taken and in which the adjustment for the load scale is automatically made.

It is further an object of this invention to provide a tire caliper in which the use of a reading scale is obviated and in which the slide head is freely slidable on the caliper arm and is so constructed that it has two limits of movement one to indicate the diameter of the tire not under load and the other to indicate the diameter that the tire should be under load.

It is further an object of this invention to provide a tire caliper in which the size of the tire is manually taken and in which the load size of the tire is automatically taken.

It is further an object of this invention to provide a tire caliper in which the slide head is freely movable and the use of springs and friction of the caliper head is obviated and in which the movable caliper arm cannot swing rearwardly out of the perpendicular.

The invention (in a preferred form) is illustrated in the drawings and hereinafter more fully described.

On the drawings:

Figure 1 illustrates a caliper embodying my invention inserted on a tire to ascertain the scale of the tire.

Fig. 2 illustrates the caliper inserted on a tire at the point of contact with the ground automatically adjusted to the load size of the tire.

Fig. 3 illustrates the caliper folded as when not in use.

Fig. 4 is a fragmentary detail with parts broken away to better illustrate the details of construction.

Fig. 5 is a section taken through the slide head with part of the gage arm omitted.

As shown in the drawings:

The reference numeral 1 indicates a caliper slide bar provided with a diagonal slot 2, therein. Pivoted to one end of the bar 1, is a gage arm 3, this arm is pivoted to fold against the bar when not in use so that the device may be folded into small compass but when in use is stationary and is limited and held in its open position by a lip or stop 4, formed at the end of bar 1, against which the top 5, of the arm 3, engages.

Freely slidable on the slide bar 1, is a slide head 6, which comprises a plate of metal folded to engage on the slide bar and provided with oppositely disposed complemental substantially trapezoidal shaped apertures 7, through which a stop device extends.

Said stop device may be of any suitable construction but as shown, comprises a stud or bolt 9, having a head 8, thereon. A washer 10, is loosely mounted on the bolt and a milled locking head 11, is threaded on the end of the bolt and by adjustment thereof on the bolt is adapted to rigidly lock the bolt 9, at any position on the slide bar or release the same to slide in the slot 2.

Secured between the folds of the plate forming the slide head is a spacing and stop block 12, and pivoted between the plates is an adjustable gage arm 13. The upper end of the gage arm is provided with a notch 14, to receive the block 12, therein, and as shown in Fig. 4, the top of the arm clears the bottom of the slide bar 1. The arm 13, is also provided with a notch 15, to permit the arm 13, folding against the slide bar when not in use.

The operation is as follows:

The size of the tire or the breadth of the tire is first taken at some point not supporting the load. This is effected by placing the caliper on the top of the tire with the tire engaged between the arm 3, and movable arm 13. The slide is adjusted until the arm 13, contacts the tire wall as shown in Fig. 1, after which the head 11, is tightened to lock the bolt 9, in position on the slide bar. In this condition the slide head is free to move the width of the apertures 7, and the particular degree of movement depends upon the relative position of the bolt in the diagonal slot 2, in the gage bar 1. The shape of the trapezoidal apertures 7, in the slide head 6, and the inclination of slot 2, are such that the movement of the slide head from one limit of movement to the other after the bolt is tightened is the scientifically correct degree of difference between the size of the tire not under load and the size the tire should be for any particular load.

After the gage of the tire is taken at a point not supporting the load and the bolt tightened as described the caliper is disengaged and then placed over the tire at the point that the load is supported. The movable caliper arm 13, is automatically shifted by placing the same on the tire. If the tire is under inflated the caliper will not drop fully in place but upon proper inflation of the tire the caliper will fit onto the tire.

Should the tire be over inflated the caliper is placed thereon and upon releasing air from the tire the same expands and shifts the movable arm automatically to its correct position.

It is seen that the use of a scale is obviated and the use of a frictionally held slide head is eliminated. It is further seen that only one setting is manually performed the other being entirely automatic and without the use of any scale.

Further the pivoted arm 13 abuts against the stop block 12, preventing springing or yielding of the gage arm 13.

I am aware that many details of construction may be varied through a wide range without departing from the principles of my invention. I therefore do not desire to limit this application for patent otherwise than necessitated by the prior art.

I claim as my invention:

1. A tire caliper comprising a slide bar, a gage arm secured to one end thereof, a slide head freely slidable on the slide bar, a gage arm pivoted to the slide head for limited movement between one position in which it is at right angles to the bar and another position in which it is parallel therewith, and a member adjustable on the slide bar and adapted to be locked thereto for setting the movable slide head and gage arm to caliper the size of the tire not under load, said slide head having apertures therein to permit the slide head and the gage arm pivoted thereon to be moved automatically to indicate the correct size the tire should assume when under load.

2. A tire caliper comprising a slide bar having a diagonal slot therein, a gage arm connected to one end thereof, a slide member adjustable on said slide bar having a substantially trapezoidal aperture therein, a locking member extending through the aperture and adjustable in the slot in said bar, and a gage arm movably connected to said slide member, said trapezoidal aperture adapted to permit the slide member to be moved an amount sufficient to indicate the increased size of a tire under load, when the locking member is locked.

3. A tire caliper comprising a slotted slide bar, a gage arm secured thereto, an apertured member adjustable on said slide bar, a gage arm movably connected to said apertured member, and means adjustable on the slide bar and projecting through the slotted slide bar and the apertured member adapted to be locked to said slide bar to permit but a limited movement of the apertured member in both directions with respect to said means.

4. A tire caliper comprising a slide bar, a gage arm connected therewith, a slide member mounted on the slide bar, a gage arm pivoted thereto, a lock member, said slide member provided with an aperture of varying width from the top to the bottom, the narrowest part thereof being wider than said lock member, and the slide bar having a diagonal slot in which the lock member is adapted to slide to vary the position of the lock member in the aperture of the slide member, said lock member passing through said slot and the aperture of said slide member.

5. A caliper comprising a diagonally slotted slide bar, an arm pivoted thereto, a slide member mounted on the slide bar having a tapered aperture therein, a gage arm pivoted to the slide member, and a member co-acting with the slide member and projecting through the slide bar slot and through said tapered aperture adapted to be locked to said slide bar and permit a free predetermined movement of the slide member equal to the difference between the breadth of a tire not under load and the breadth of a tire under load.

In testimony whereof I have hereunto subscribed my name in the presence of two subscribing witnesses.

BAYARD E. TAYLOR.

Witnesses:
　CHARLES W. HILLS, Jr.,
　EARL M. HARDINE.